United States Patent [19]

Dunkers

[11] Patent Number: 4,842,751
[45] Date of Patent: Jun. 27, 1989

[54] METHOD AND APPARATUS FOR FILTRATION USING WASHABLE FILTER BAG FOR WATER AND WASTEWATER TREATMENT

[76] Inventor: Karl R. Dunkers, Hästskovägen 7, S-183 50 Täby, Sweden

[21] Appl. No.: 24,667

[22] Filed: Mar. 11, 1987

[51] Int. Cl.⁴ .............................................. B01D 29/38
[52] U.S. Cl. .................................... 210/798; 210/170; 210/411; 210/427
[58] Field of Search ............... 210/136, 196, 199, 791, 210/797, 798, 108, 170, 333.01, 411, 425, 427

[56] References Cited

U.S. PATENT DOCUMENTS

| | | |
|---|---|---|
| 3,549,015 | 12/1970 | Willinger . |
| 3,879,290 | 4/1975 | Arnot ................................ 210/199 |
| 4,104,164 | 8/1978 | Chelton ............................. 210/196 |
| 4,210,528 | 7/1980 | Tantillo et al. .................... 210/427 |
| 4,298,471 | 11/1981 | Dunkers . |
| 4,478,714 | 10/1984 | Blake et al. ........................ 210/136 |

FOREIGN PATENT DOCUMENTS 1344114 1/1974 United Kingdom .

OTHER PUBLICATIONS

International Search Report PCT/SE87/00355.

Primary Examiner—Frank Sever
Attorney, Agent, or Firm—Stevens, Davis, Miller & Mosher

[57] ABSTRACT

A method and an apparatus for removing filterable particles from water are disclosed. One or more filter bags made from a filter material suitable for filtering off the particles to be separated are disposed in a body of water with the bottom of the bag situated below the water surface and its opening situated above the surface. The water flows through the wall of the filter bag to the surrounding body of water, while the particles remain within the bag. After a certain amount of particles has been collected in the filter bag, backwashing is carried out and the particles removed and conducted to a place remote from the body of water. The method and apparatus are particularly suitable for restoration of lakes, rivers, water courses and similar water bodies.

8 Claims, 3 Drawing Sheets

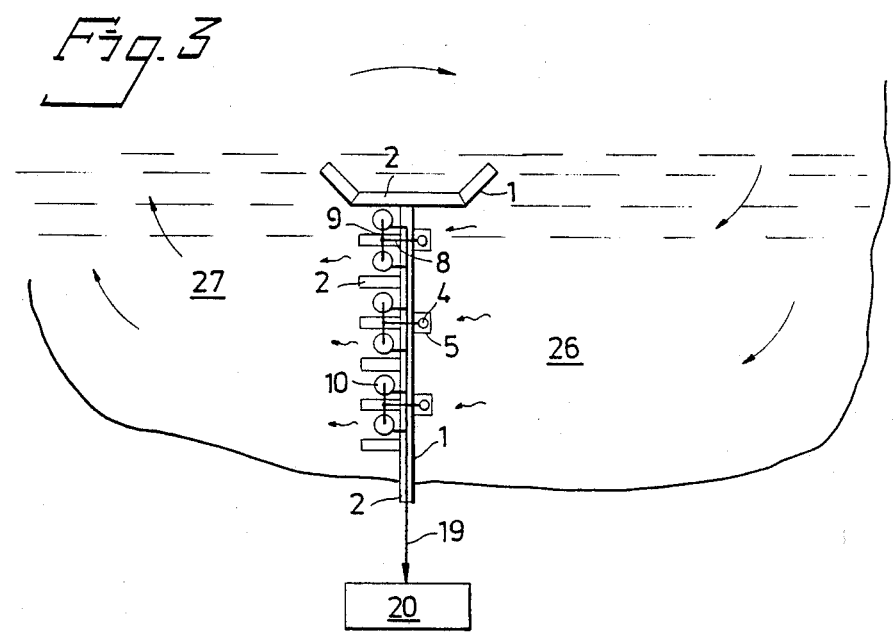
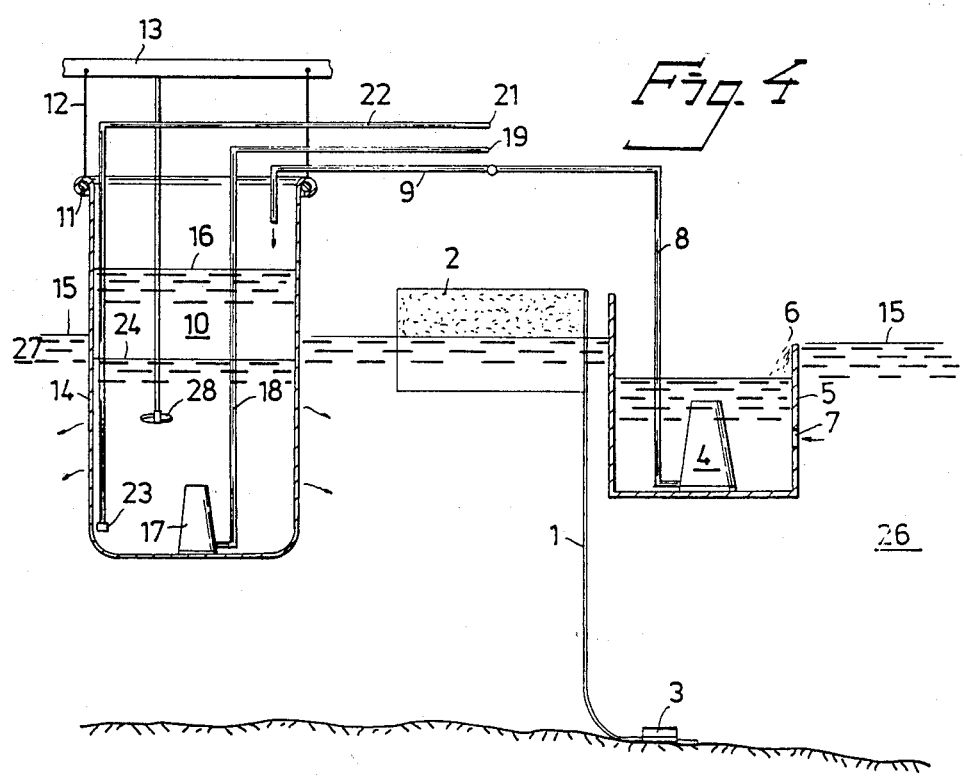

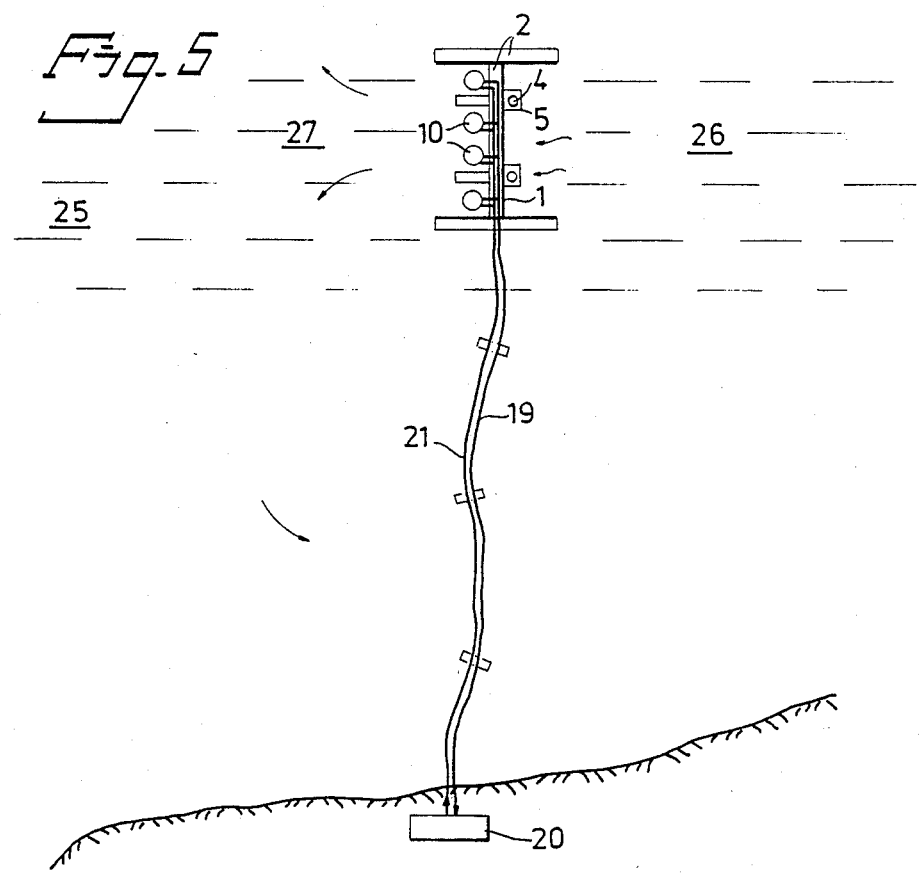
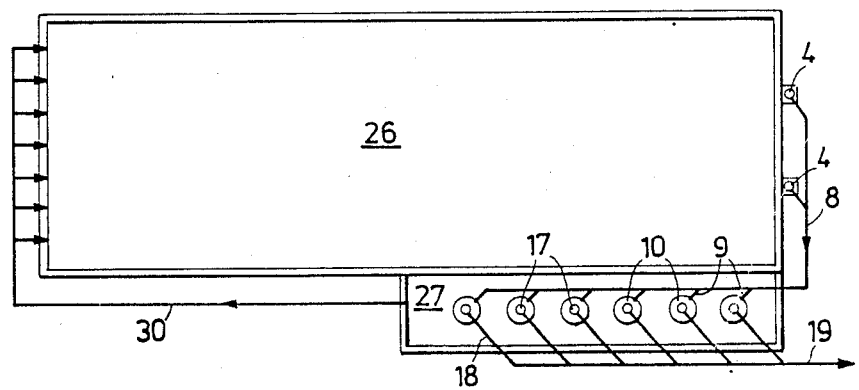

METHOD AND APPARATUS FOR FILTRATION USING WASHABLE FILTER BAG FOR WATER AND WASTEWATER TREATMENT

The present invention relates to novel means for separating filterable particles, such as suspended solids, algae, plankton, flocs in connection with chemical preciptation etc., from water, e.g. underground water or surface water in association with water purification, flowing water in open watercourses, sewage, wastewater etc.

For filtration of water in general water treatment, i.e. purification of underground water or surface water for domestic use and purification of municipal and industrial wastewater, there are used mainly washable filter beds, where the filter material consists of granular matter, such as filter sand, anthractie, activated carbon etc. These filter beds require a bed depth of about 0.6 to 2.0 meters, although the actual filtration process takes place substantially in a restricted layer of only a few dicimeters. Other disadvantages of the conventional filtering technique are the requirement for a relatively low filter rate, i.e. a low rate of flow, and the need of great backwash flows which are also highly diluted and therefore expensive to dewater. The backwash flow rate through the bed must be sufficient to effect an expansion of the bed, so that filtered particles are released from the filter grains and removed by the backwash water.

The main object of the present invention is to provide a filtering technique which eliminates the disadvantages of the prior art. The filtering technique of the present invention does not require expansion or great backwash flows. The filtering process is concentrated to a filter layer of only a few millimeters in thickness, which makes the release of particles during backwash considerably simpler than in the case of filter beds. Furthermore, the effluenct backwash water is more concentrated which facilitates dewatering and further treatment of the backwash.

The invention relates generally to a method of removing filterable particles from water, which comprises providing in a body of water a filter bag made from filter material adapted for the removal of such particles, with the bottom of the bag disposed below the surface of said body of water and its opening above the surface, introducing into the interior of the bag the particle-containing water to be filtered, so as to cause water to pass through the filter bag to the surrounding body of water, while the particles remain while the filter bag, and after a certain amount of particles has been collected in the filter bag, interrupting the supply of particlecontaining water and withdrawing the particles collected in the bag to a location remote from said body of water.

The invention also provides an apparatus of carrying out such method, said apparatus comprising essentially at least one filter bag made from a material suitable for filtering off said particles and arranged in a body of water with its bottom below the surface of said body of water and its opening above said surface, an inlet conduit arranged for supplying water to be filtered into the interior of the filter bag and a pump arranged within the bag and connected to a conduit for transferring particles collected within the filter bag to a location remote from the body of water.

An application of particular interest for the present invention is the restoration of eutrophied lakes and water courses. In these, great amounts of algae, plankton and other biological matter are formed which together contribute to increased turbidity, overgrowth, accumulation of nutrients and deteriorated oxygen conditions.

In countries having a temperature climate algae and plankton occur seasonally. During the warmer half of the year "blooming" periods occur with an abundant biological growth due to supply of too great amounts of nutrients. After the end of such a period dead algae and plankton settle to the bottom sediment. During the cold half of the year oxygen-deficient conditions develop within the bottom sediments, whereby phosphorus and nitrogen of the cell material are set free and will be available for the build-up of cells for the next generation of biological life. Thus, an endless cycle of nutrients is set up in lakes, resulting in progressive overgrowth of the lake.

Generally, it can be said that the art still is without an inexpensive and efficient technique which would permit this cycle to be interrupted and allow the separation of excess nutrients from the aqueous phase of the cycle and/or from the bottom sediment phase thereof. In spite of extensive and costly work involving inter alia dredging, chemical manipulation of the bottom sediments, chemical precipitation, cultivation of algae, oxygenation etc., the results have hitherto revealed themselves as modest and questionable in relation to the scope and cost of the work involved.

This invention will contribute novel solutions to these problems. During the "blooming" period the nutrients are bound in algae and plankton. Therefore, they are available for filtration provided that suitable filtering technology exits. By the use of floating filter bags in the lake, in accordance with the present invention, the problem has obtained a solution. Algae and plankton are collected in the bag by filtering the lake water through the filter bags and the algae and plankton mass thus collected and concentrated in the filter bags, will be pumped during the backwashing periods to a receiving station arranged, e.g., on shore for further treatment.

The particular manner of applying the invention in this context comprises providing in the body of water substantially vertical walls extending from the bottom to the surface, said walls separating two regions of the water body at least partly from each other, providing in one of said regions one or more filter bags and supplying water from the other region to the interior of the filter bag or bags are filtration, the two water regions being substantially without direct communication from the latter region to the former region, and conducting the particles collected in the filter bag or bags to a separate treatment station.

The invention will be described more in detail in connection with the accompanying drawings, which by way of example, but without limiting the invention thereto illustrate various embodiments thereof.

FIG. 3 shows a diagrammatic plan view of an apparatus according to the invention used for the restoration of a lake.

FIG. 4 shows a partial vertical cross-section of certain parts of the apparatus of FIG. 3, in an enlarged scale.

FIG. 5 shows a plan view illustrating a modification of the embodiment of FIG. 3.

FIG. 6 shows a diagrammatic plan view illustrating the application of the invention for water treatment in a fish-culturing tank.

Figure 1:
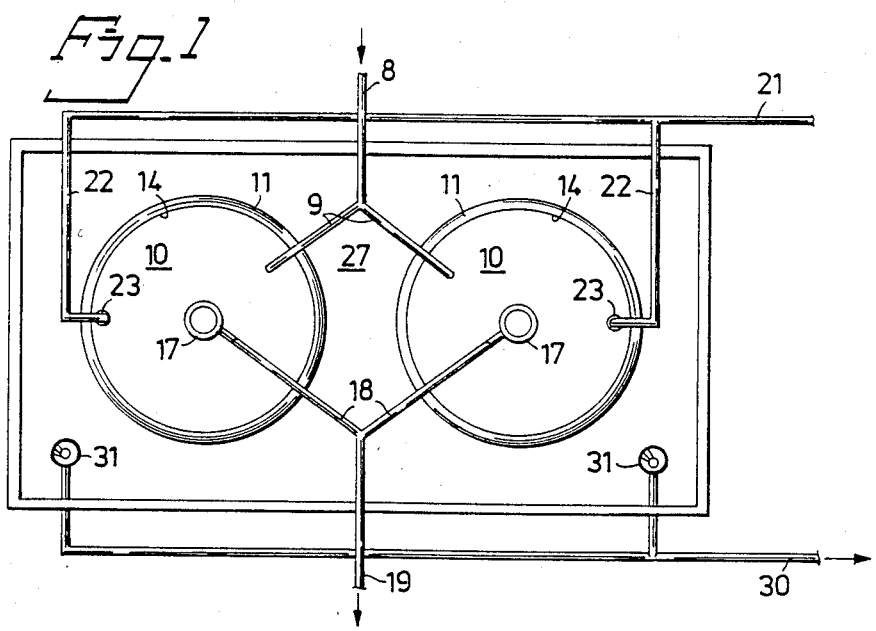
FIG. 1 is a diagrammatic plan view illustrating the invention as applied to filtering technology generally.
Figure 2:
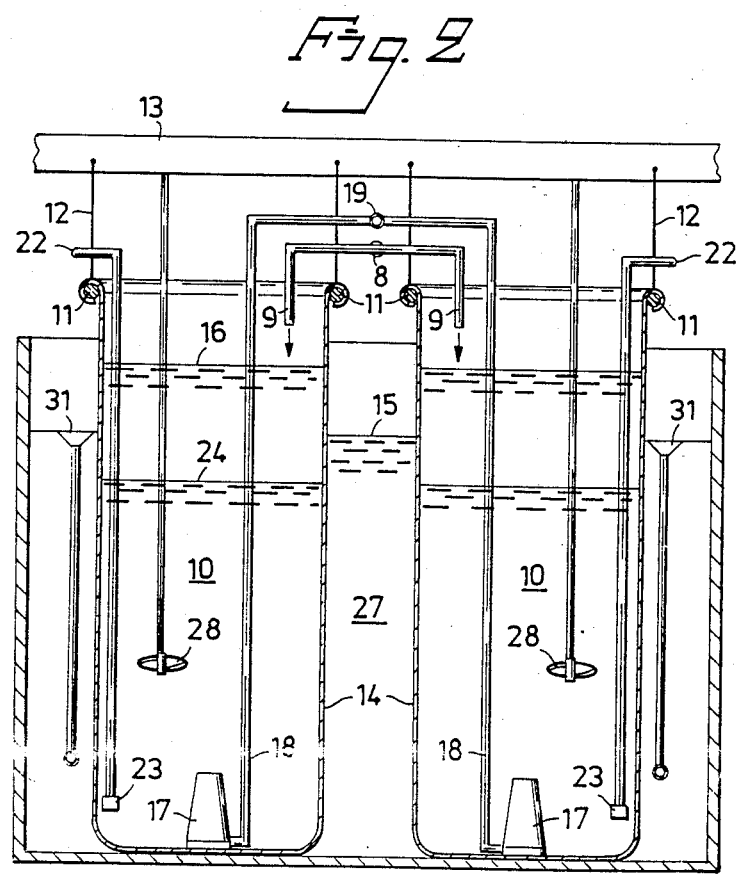
FIG. 2 shows a vertical cross section of one of the filter bags of FIG. 1 together with associated equipment.

Referring to FIGS. 1 and 2, there is shown a confined tank space 27 filled with already filtered water, wherein two submersible filter bags 10 are supported in a manner shown in detail in FIG. 2. The bags are tensioned over rings or frames 11, which by means of stays 12 are attached to suspension means 13. The bags are suspended so that they are disposed partly above, partly below the water surface 15 in the tank 27, the bottom of the bag being of course disposed in the body of water. The walls 14 of the bags 10 are made from a material adapted to serve as a filter sheet of the type of permeable diaphragm.

Water to be filtered is introduced into the filter bags 10 by inlet conduits 8 and 9 which may be conduits for supply under pressure or for supply by gravity.

The water passes through the bag walls 14 and is thereby filtered so that filterable matter remains in the bag, mainly adhering to its inner walls, while the filtering water or clear phase flows out through the walls 14 into the adjoining and surrounding water space 27.

As filterable substances are separated and deposited on the inner walls of the filter bags 10, the flow resistance increases and the water level 16 within the bag rises relatively to the water level 15 of the body of water 27. When the difference between these levels has reached a predetermined maximum value, backwashing is started, manually or automatically, by starting a backwashing pump 17 disposed within the bag. The backwashing pump 17 pumps the separated matter from the filter bag 10 through a pressure conduit 18 and a main conduit 19—which may be common to both filter bags 10—to a receiving station for further treatment of the separated matter. The receiving station may comprise means for dewatering, storage for subsequent discharge, fermentation for making biogas and energy recovery, admixture of lime for using the mass as an agricultural fertilizer etc.

Simultaneously with the start of the backwashing pump 17 injection of compressed air into the filter bags 10 is started, manually or automatically, the compressed air being supplied from a main conduit 21, branch conduits 22 and air injection nozzles 23. The latter are disposed so that the issuing jets of compressed air are directed tangentially and horizontally, which results in a helically ascending movement of the air bubbles so that the separated solid matter within the filter bags is caused to rotate. This has the effect that separated particles are more easiliy released from the inner walls of the filter bag and sucked inwardly towards the centrally disposed backwashing pump 17.

The effects of the air injection in connection with the backwashing operation can alternatively be achieved in an equivalent manner by using mechanical agitators arranged on vertical shafts, as shown schematically at 28. It is of course also possible to use air injection and mechancial agitation in combination, if desired.

While water to be filtered is supplied to the filter bags through conduits 8 and 9, water in a corresponding rate of flow will leave the tank space 27 through overflow outlets 31 to a filtered water outlet conduit 30 to be conducted to ultimate use.

During the backwashing period the supply of water to be filtered is interrupted. This has the result that the water level 24 within the filter bag drops below the water level 15 in the adjoining water space 27, due to the resistance to flow through the walls when the backwashing pump is operating. The direction of flow through the bag walls is opposite to that in the filtering period. This contributes effectively to the releasing of separated particles from the inner walls of the bag during backwashing.

The backwashing water preferably consists of water from the sme water body which the filter bags are provided in, i.e. previously filtered water. Thus, clean backwashing water is available in practically unlimited amounts.

FIGS. 3 and 4 shows how the filtering technique of this invention can be applied to restore lakes, which as mentioned above is an important application.

In FIGS. 3 and 4 corresponding details have the same reference numerals as in FIGS. 1 and 2.

A system of hanging sheets 1, consisting of e.g. of plastic material, is suspended in a body of water from floating pontoons 2. At the lower edge of the sheets are weights 3 which hold the sheet against the bottom of the body of water. In this way the sheets divide the body of water in two regions 26 and 27 which are partly separated from each other.

Adjacent to the pontoons are one or more pumps 4 disposed in floating pump boxes 5 open at their tops. When a pump 4 is operating, water flows from the adjacent water region 26 into the pump box 5, which occurs partly through openings 6 at the water surface and partly through lower openings 7 close to the bottom of the pump box. By virtue of this arrangement both floating particles and particles suspended in the water may be supplied to the pump boxes 5.

The pumps 4 pump water from the pump boxes 5 through pressure conduits and branch conduits 9 to one or moresubmersible filter bags 10 arranged in the manner described above with refernece to FIGS. 1 and 2. As the water passes through the filter bag walls 14 it is filtered so that filterable matter—in this application mainly algae and plankton—remains in the bag, mainly deposited on its interior walls, while the filtered water, the clear phase, flows out into the adjacent and surrounding water region 27.

As filterable matter is separated and accumulates on the inner walls of the filter bags, the resistance to flow increases and the water level 16 within the bag rises relatively to the level 15 of the surrounding water. When the difference between the levels has reached a predetermined maximum, supply of water by means of pump 4 is interrupted and backwashing is started by means of the pump 17 which pumps the separated matter through the conduits 18 and 19 (the latter being common to several filter bags) to a receiving station 20 situated on shore for further treatment of the separated matter.

As described with reference to FIG. 2, injection of compressed air into the filter bags 10 through conduits 21 and 22 and air injection nozzles 23 and/or mechanical agitation by means of agitators 28 will be started at the same time as backwashing pump 17 is started, so as to facilitate removal of the separated matter from the filter bags.

The arrangement comprising sheets 1 suspended in the water and filter bags 14 together with the pumping means form a system which disposed in a lake or similar water body 25 defines a water region 26 wherefrom water is conveyed through the filter bags to a second water region 27 which contains mainly filtered water. This arrangement induces a circulation in the entire water body 25 as illustrated with flow arrows in FIG. 3. However, convection streams, wind effects and temperature variation with resulting agitation effects will have the effect that the flow pattern will be broken from time to time. This in turn will results in new amounts of algae and plankton being supplied to the region 26 for further pumping to the filtration stage.

Referring now to FIG. 5, this illustrates how the water treatment system comprising filter bags according to the invention can also be applied to large open lake surfaces, water courses or ponds wherein a pontoon connection from the filter bags to the shore would be too long and costly. Instead, in this case the pontoon system 2 with its depending sheets form an independent floating and towable unit which can be moved around in the water body for filtering off and carrying away algae and plankton.

Pumps 4 in pump boxes 5 and filter bags 10 are arranged according to the same principles as described above, see FIG. 2. Conduits 19 for removal of algae and plankton and compressed air conduits 21 must in this application either be disposed on the lake bottom or be mounted on floating bodies on the lake surface, as shown in FIG. 5.

Another similar application is water treatment in fish-culturing installations. Feed residues and fish feces are formed in great amounts in the culture tanks and are a troublesome and costly problem. With the present invention it is possible to dispose of these impurities by filtration in suitably arranged filter bags with associated backwashing system. This is applicable both in sea-based and land-based fish culture installations, as illustrated in FIG. 6.

Means similar to those described above, such as pumps 4 (here without pump boxes), pressure conduit 8, branch conduits 9, filter bags 10, backwashing pumps 17 and backwash conduits 18 and 19, are arranged within or associated with a confined space 27 which, as above, is filled with filtered water. Unfiltered water is pumped from the region 26 in the culture tank or pond by means of pumps 4 to filter bags 10 and filtered water is returned through conduit 30 to the inlet end of the tank or pond.

What is claimed as new and desired to be secured by Letters Patent of the United States:

1. A method of removing filterable particles from water, comprising
   providing in a body of water a filter bag made from a filter material suitable for separating said particles, with the bottom of the bag situated below the water surface and its top opening above the water surface,
   introducing particle-containing water to be filtered into the interior of the bag, whereby the water flows through the filter bag to the surrounding body of water, while particles remain within the bag,
   and after a predetermined amount of particles have been collected in the filter bag, backwashing the filter bag and removing the particles collected in the bag to a place remote from said body of water while the bag remains disposed in the body of water by causing water to flow from the surrounding body of water through and into the filter bag.

2. A method as in claim 1, wherein backwashing of the filter bag and removal of the particles collected in the filter bag are achieved by means of a backwashing pump disposed within the filter bag.

3. A method as in claim 1, wherein the contents of the filter bag are subjected to agitation, e.g. by injection of air and/or by mechanical agitators.

4. A method as in claim 1, wherein the filter bag is provided in a body of water consisting essentially of previously filtered water.

5. A method as in claim 1, wherein the supply of water to be filtered is interrupted and backwashing started when, as a result of the increase of resistance to flow through the filter bag due to deposition of particles, the water level within the filter bag has increased to a predetermined value.

6. A method as in claim 1 applied to restoration of water bodies which comprises providing in the body of water substantially vertical walls extending from the bottom to the surface, said walls separating two regions of the water body at least partly from each other, providing in one of said regions one or more filter bags and supplying water from the other region to the interior of the filter bag or bags for filtration, the two water regions being substantially without direct communication from the latter region to the former region, and conducting the particles collected in the filter bag or bags to a separate treatment station.

7. An apparatus for removing filterable particle from water, comprising:
   at least one filter bag made from a material suitable for filtering off said particles and means enabling said bag to be arranged in a body of water with its bottom below the surface of said body of water and its top opening above said surface,
   an inlet conduit arranged for supplying water to be filtered into the interior of the filter bag and a pump arranged within the bag and connected to a conduit including means for backwashing and transferring particles collected within the filter bag to a location remote from the body of water while the bag remains disposed in the body of water.

8. An apparatus as in claim 7, wherein one or more of said filter bags are provided in a first region of said body of water, one or more pumps are arranged in a second region of said body of water and connected to conduits for introducing water from said second region into the interior of said filter bag or bags, and vertical walls are disposed in the body of water in such a way as to prevent direct flow of water from the second region to the first region.

* * * * *